United States Patent

Lovell

Patent Number: 5,905,861
Date of Patent: May 18, 1999

[54] DATA AUTHENTICATION CIRCUIT

[76] Inventor: William S. Lovell, 17630 SW. Butternut Dr., Aloha, Oreg. 97007-3929

[21] Appl. No.: 08/759,269

[22] Filed: Dec. 2, 1996

[51] Int. Cl.⁶ .................................................. G06F 11/30
[52] U.S. Cl. ....................................... 395/188.01; 380/23
[58] Field of Search .............................. 395/186, 187.01, 395/188.01, 727, 183.19, 835, 838; 380/3, 4, 23, 25, 43

[56] References Cited

U.S. PATENT DOCUMENTS

| | | | |
|---|---|---|---|
| 4,310,720 | 1/1982 | Check, Jr. ........................... | 178/22.08 |
| 4,430,728 | 2/1984 | Beitel et al. ........................ | 364/900 |
| 4,679,226 | 7/1987 | Muehleisen ........................ | 379/95 |
| 4,691,355 | 9/1987 | Wirstrom et al. .................. | 380/23 |
| 4,694,492 | 9/1987 | Wirstrom et al. .................. | 380/23 |
| 4,733,345 | 3/1988 | Anderson ........................... | 380/25 |
| 4,763,351 | 8/1988 | Lipscher et al. ................... | 380/25 |
| 4,845,715 | 7/1989 | Francisco ........................... | 395/186 |
| 4,905,281 | 2/1990 | Surjaatmadja et al. ............. | 380/25 |
| 5,153,918 | 10/1992 | Tuai ................................... | 380/25 |
| 5,202,921 | 4/1993 | Herzberg et al. .................. | 380/23 |
| 5,202,997 | 4/1993 | Arato . | |
| 5,283,828 | 2/1994 | Saunders et al. .................. | 380/4 |
| 5,469,564 | 11/1995 | Junya ................................. | 395/188.01 |
| 5,694,471 | 12/1997 | Chen et al. ........................ | 380/4 |
| 5,699,514 | 12/1997 | Durinovic-Johri et al. ....... | 395/188.01 |
| 5,706,426 | 1/1998 | Hsu ................................... | 395/186 |

*Primary Examiner*—Robert W. Beausoliel, Jr.
*Assistant Examiner*—Nadeem Iqbal
*Attorney, Agent, or Firm*—William S. Lovell

[57] ABSTRACT

A method and apparatus for computer security both as to unauthorized remote access thereto and unauthorized local use of selected components thereof are provided. As to re , the communications system of the computer is first disabled as a whole by internal hardware means, and then additional hardware means are provided that can be used locally to enable selected communications operations such as data transmissions to remote sites. As to unauthorized local use of selected components, hardware is provided that includes a preselected password that must be duplicated by an operator before the selected component can be used, wherein that duplication requirement cannot be bypassed by programming means.

19 Claims, 3 Drawing Sheets

DATA AUTHENTICATION CIRCUIT

BACKGROUND OF THE INVENTION

FIELD OF THE INVENTION

This invention relates to digital computer systems, and especially to methods and apparatus for distinguishing between data words that may otherwise be identical in terms of their physical origins, for such purposes as protecting against the unauthorized entry of data into a computer through communications lines, this particular purpose being especially directed towards methods and apparatus for discriminating between remote data and data that have been generated locally as by a keyboard or mouse or the like. Related apparatus and methods of authenticating digital data control local access to selected computer peripherals.

INTRODUCTION

Existing computer security systems are based upon a model in which (1) a fully functional communications system is presumed to be present in the local computer; and (2) means are then provided by which access to that communications system by a remote user can be restricted. Such means include the use of passwords, encryption, address authentication or the like, and depend in every case upon the specific content of data that are transmitted from a remote site to the local computer. Although various quite ingenius schemes have been conceived by which access to knowledge of such data content can be restricted, in principle all such specific content that might so be used is discoverable by unauthorized persons, whereby the security system will be compromised. Therefore, no such system can be said to be totally secure.

The present invention constitutes an instance in which a security system is based upon a quite different model, namely: (1) a fully functional communications system within the local computer is disabled by local hardware means; and (2) modes of communication that are sought to be carried out by a local operator are selectively enabled, again by local hardware means. Such a system cannot be compromised by a remote operator, since that person does not have access to the hardware of the local computer, and therefore, at least insofar as any such remote operators are concerned, the communications system is totally secure.

Preferably, those hardware means by which the communications system is disabled will at the same time permit all of the local computer operations that do not involve external communications to be carried out as before, and the present specification shows and describes how that may be accomplished.

BACKGROUND INFORMATION

A CPU will execute those commands that it receives on its command bus, and generally without regard to how a particular command may have arrived on that bus. At times it may be advantageous to distinguish data words as to origin, however, since the command bus may be given commands that the computer owner does not wish to have executed. In particular, the proliferation of computers and their connections to communications lines for purposes of FAX or other data transmissions, including processes for controlling the operation of a local computer by means of remotely-transmitted commands as by Telnet and similar processes, have provided opportunities for unauthorized access to the computers of others, or else to carry out unauthorized remote operations on computers to which a person may have authorized local access. The activities of such persons, now often called "hackers," may include the unauthorized perusal and copying of local data files or the transmission into the local computer of false data, including "viruses" that may impede or even disable the operation of that local computer.

All of these instances depend for their occurrence, in one way or another, on the transmission of data into the "target" computer, represented either by such data itself or by instructions that permit (i.e., cause) either the entry of such data or the perusal of data (which may be confidential) that is already in the computer. More specifically, the code by which the unauthorized operations are intended to be initiated and carried out must be placed onto a particular bus associated with the CPU, and such code (if a virus) may then corrupt programs existent in the computer memory, or if not a virus may at least provide access to the computer memory for other unauthorized purposes.

To prevent such events from occurring, recourse has been had to the use of passwords, which are preselected sequences of bits that, after a particular computer has been programmed accordingly, must be entered as an initial or early data string prior to any subsequent computer operations. Inasmuch as the permutations and combinations of any finite number of bits are themselves finite, however, programs have been written that will sequentially test a series of algorithmically-generated passwords, or employ similar such means, until the particular password that was encoded into a particular computer is found, whereafter a remote operator employing such a program then has full access to that local computer. The use of such encoding schemes thus affords but limited means for preventing such unauthorized use. In addition, an employee or consultant may have authorization to operate a particular computer within the environs of the company, but not be authorized to operate that computer from a remote site, and in this case the required passwords may already be known to that employee or consultant.

There are, of course, other means for establishing computer security, the most obvious of which is simply to turn the computer off — there exist no means by which data that would operate a local computer can be transmitted thereto from a remote site and have any effect if the local computer has not been turned on. Comparable means are found in turning on the local computer but disabling all of the communications lines leading thereto, e.g., by unplugging lines such as telephone lines that lead from the local computer to the outside world so that local operation without outside interference is assured. Another closely related procedure lies in disabling the electronic unit that leads from the outside communications line to the remainder of the computer, e.g., if the computer has been provided with a modem or an ISDN unit, it can be turned off so that any unauthorized data that was transmitted from some remote source to that modem or ISDN unit would simply encounter a "dead" circuit and would have no effect. In addition to such hardware being interposed between such a telephone line and the computer, for any communication with the computer to occur there must also be present and operational some appropriate software that would enable the modem or ISDN unit to "answer the phone," such as FAX software, answering machine software, server software for responding to FTP requests or otherwise act as a data transmittal "daemon," or perhaps TCP/IP software for Telnet response. The so-called "firewall," which effectively puts an unprotected computer between the outside phone lines and one or more additional computers for purposes of "screening" incoming data is a related security device. The functional elements of such a firewall may of course be installed within, or as a peripheral unit to, the computer(s) to be protected.

For reasons of convenience, however, it is often desired that those computers that are in daily use for local purposes (FAX transmission, logging onto the Internet, etc.) should remain immediately connectable (given an appropriate sequence of commands) to those communication lines. The current design of internal modems, for example, is such that the modem may be configured to turn on automatically when the computer is turned on, although the software need not turn on. An operator might also wish to have a modem or ISDN unit in "standby" operation (i.e., the communications software is turned on) while drafting some document on a word processor or spread sheet or the like so that immediately upon completing such drafting, with just a few key strokes the document can be transmitted to a desired remote location. Although a security-conscious operator may have adopted a practice of unplugging the telephone line or turning off all communications hardware whenever the computer was to be left unattended but still turned on, the operator may forget to carry out such procedures, and in any event the requirement to follow such procedures may serve as an irritant in the ordinary course of operations, and thus increase the likelihood that those procedures may be overlooked or neglected.

It would be useful, therefore, to provide some method and apparatus that will "shield" a computer from the entry therein of unauthorized data from remote sites, and in particular such a method and apparatus that will not be dependent upon the use of passwords or any similar such software means, and will also not require the use of easily neglected security procedures in every instance in which a computer is to be left unattended. Preferably, implementation thereof should occur automatically and be "transparent" to the operator, by which is meant that an operator who had not otherwise been informed would be unaware that such method and apparatus were even in place. (One reason for implementing such a procedure is found in studies which indicate that in corporate "hacking," the majority of "computer crime" is indeed "in-house," by which is meant that company employees or consultants have used their knowledge of passwords and the like to access company computers from their homes or other sites and then to carry out unauthorized activities.)

SUMMARY OF THE INVENTION

Therefore, the invention comprises a method and apparatus for preventing the transmission into a local computer from any remote site of undesired data or commands, including any that would compromise the operation of the local computer, introduce "viruses," or provide access to any of the files of the local computer. To carry out this method, the apparatus is required to be present only on the local computer, and not on any remote computer, and further involves no communication to any remote computer although there would be of course be indication to that remote computer that the data or commands sought to be communicated to the local computer were indeed ineffective.

The method centers on the use of an authenticator circuit, the function of which is to discriminate between data that have been transmitted to the local computer over a communications line and data that have been locally generated. When using a keyboard or a mouse as local input devices to the local computer, the authenticator circuit ensures that data originating from any source other than one of those local devices can have no operational effect on the local computer, even when the external communications lines have been left operational and the local communications devices such as a modem or ISDN unit have likewise been left operating with the applicable software running, and even though such remotely-generated commands or similar digital data, had the transmission of such data to the CPU been permitted, would have been indistinguishable from such data that was locally generated.

In a preferred embodiment of the invention, the actual presence and operation of the aforesaid authenticator circuit is transparent to a local operator, who will not know of the existence of the same unless otherwise informed (or unless the invention had been discovered by way of a local hardware examination). Also, operation of that authenticator circuit is preferably automatically bypassed upon local initiation of any external communications sequence, such as the transmission of a FAX or connecting to the Internet, and the operation of the authenticator circuit is then re-initiated immediately following the termination of such a locally-initiated sequence, again without the operator necessarily being aware of such effects and without knowing that such authentication procedures had been present and operating. In addition to the inherent simplicity and transparency of the invention, its principle characteristic is that it has no software component and thus cannot be circumvented by methods that use mathematical algorithms or the like to determine passwords.

To provide access security within the computer itself when locally operated, e.g., when authorization for access to selected programs, memory, peripherals or the like is to be restricted by conventional password schemes, the circuitry of the present invention also provides a convenient means for disabling such access to unauthorized users. One method of overcoming a local password requirement is to introduce (perhaps by surreptitious programming) a logical "shunt" around the program code wherein the appropriate password would ordinarily be entered, and in this case the authenticator circuit may be used to render any such logical shunt ineffective. When using the authenticator circuit either for "external" security (as to data coming in over a telephone line) or "internal" security (as a "password authenticator" isolating local computer operations from unauthorized users), the authenticator circuit may in principle be implemented as a feature either of the CPU or of the ROM-BIOS, the external circuitry therefor being adapted accordingly; when using a CPU or ROM-BIOS that lack the authenticator circuit the addition thereof may be incorporated into the design of the computer as a whole; or the authenticator circuit may be retrofitted to existing computers. (The aforesaid options are given in an order that would most likely be of decreasing preference, in terms of an operator who might wish or happen to discover that such a security feature was in place.) In the Pentium (Trademark of Intel, Inc.) chip, for example, this circuitry could be incorporated into the firmware that makes up the System Management Mode (SMM).

BRIEF DESCRIPTION OF THE DRAWINGS

The preferred embodiments of the invention will now be described in detail with reference to the accompanying drawings, in which.

DETAILED DESCRIPTION OF THE INVENTION

Figure 1:
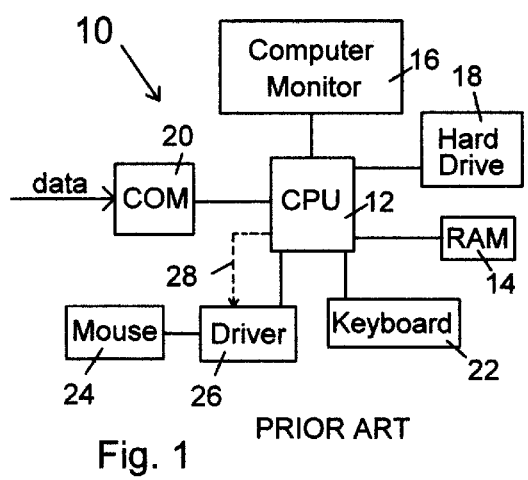
FIG. 1 is a block diagram of a computer system with peripherals in accordance with the prior art.

FIG. 1 shows a functional block diagram of a computer system 10 in accordance with the prior art, commencing with an ordinary CPU 12 and a RAM unit 14 connected thereto, the disposition and detailed interconnections of which through busses either within the CPU or on a mother board are formed in the usual manner. Typically, there will also be connected to CPU 12 a computer monitor 16, and usually one or more hard drives 18 as well. Of particular significance to the present invention is the communications ("COM") unit 20 that connects to an outwardly-directed serial port that is either on a separate board (that perhaps contains additional RAM) or on the mother board that includes CPU 12 and RAM 14. A telephone line, indicated by the label "data" in FIG. 1, connects to the opposite side of that serial port. COM unit 20 includes a modem that will further include a UART that converts serial data received over the telephone line to parallel data for use by the computer, and when reference is made below to any connection from COM unit 20 (or its alternative, discussed below) to CPU 12 or to other circuitry, a connection from the UART register containing such parallel data is meant. (Corresponding connections to an ISDN unit, if used instead of a modem, must of course be presumed.)

Operator control of computer system 10 is typically carried out by means of a keyboard 22 that generates parallel-encoded data connected either directly or indirectly to that same mother board, i.e., the data generated by keyboard 22 are in parallel form (e.g., in 8-bit bytes) as they are received by CPU 12 (i.e., by a particular CPU bus). As an alternative input device, computer system 10 may include a mouse 24, data from which are in serial form initially but which are converted into parallel-encoded form similar to that from keyboard 22 by means of a mouse driver 26 in conjunction with CPU 12 and perhaps RAM 14 as shown by dashed line 28. As an example, parallel-encoded commands such as "Control+F" and the like that may be formed directly in ASCII code using keyboard 22 can similarly be generated from seriallyencoded positional and activation ("clicking") data from mouse 24 by means of mouse driver 26, CPU 12 and possibly one or both of RAM 14 and hard drive 18, that provide through some display program the equivalent of a "positional grid" for the mouse pointer. Without regard to how such command data may have been generated within some particular local computer system, when finally placed on the appropriate bus of CPU 12 and thence into a register within CPU 12 so as to be executed, many of such commands are indistinguishable as to source, i.e., as to which of keyboard 22, mouse 24, or perhaps some other local device was used to generate the particular command.

With reference to the invention, such commands that will have arrived at that same bus and register from COM 20 will likewise be indistinguishable as to source. More specifically, data or commands that are placed by any means onto the appropriate bus of CPU 12 so as then to be executed or have some other effect cannot thereafter be identified as having been generated locally or remotely, and the unauthorized data of a remote "hacker" is thus indistinguishable from the presumably authorized data of a local operator, and will cause the same operations as would like data or commands entered by that local operator. It is that situation which the invention addresses.

Other such input devices as pens, track balls or digitizers that operate in a similar manner may also be employed, but each of these devices must likewise, at some point in their interconnections with CPU 12, generate at least some parallel-encoded data that will be indistinguishable from such data as might have been generated by keyboard 22. Consequently, in the subsequent discussion of the invention, reference will be made only to keyboard 22 (or to an alternative keyboard 22'), but it will be understood that the principles and circuitry of the invention to be described may easily be adapted by those of ordinary skill in the art to such other types of input devices, and the invention must be understood to incorporate the use of such other devices as well. That is, the purpose of the invention relates to a need to distinguish data that have been locally generated by any means from data that may have arrived at CPU 12 through COM 20, hence no loss of generality should be construed from describing the method and apparatus for so doing in terms of keyboard 22 (or 22') alone.

Also, keyboards and modems and the like often connect in common to the main bus of the CPU, which simplifies introduction of the invention. In any such case, line 38 of FIG. 2 and thereafter may be interpreted simply as connecting at point N to that bus (i.e., to data lines thereof). In the event the keyboard and modem ordinarily connect to different busses, however, the architecture would need to be altered so that point N would become that bus (or at least one particular bus), i.e., the invention as shown in FIG. 2 and thereafter requires a common line 38 through which data from either the modem and the keyboard might pass.

Of course, given the architecture and interconnection circuitry of presently available CPUs, implementation of the invention may be difficult, hence the invention is intended to encompass those cases in which a CPU may indeed require re-designing in order to accommodate the same, i.e., the circuitry which comprises the invention, or at least some parts thereof, may be incorporated into the circuitry of the CPU chip itself at its time of manufacture, as similar such "peripheral" circuits such as cache memory have so been included in the past. The invention, in other words, is intended to encompass the functional circuitry that is incorporated therein, and also the application thereof in a computer-like environment, without regard to how the particular circuit components that make up any particular computer-like environment may be distributed among specific integrated circuit chips or the like. In that same regard, computers may also include a variety of different types of busses, e.g., an ISA, EISA, SCSI or other bus type, whether presently known or not, and the invention is intended to encompass the use of such busses as well, so long as there exists some node in the bus that is electrically common to data arriving thereon from a modem or an ISDN unit or the like, on the one hand, and data arriving thereon from a local keyboard or the like on the other. In such a computer system, using any such type of bus, there will exist some one or more particular nodes that will be identifiable by a person of ordinary skill in the art through which will ordinarily pass some sequence of digital data that will have been derived either (1) using some local input device or (2) from some remote computer system over a communications line, and it is the purpose of the present invention to distinguish between those two types of data and command sources so as to prevent those that are transmitted from a remote computer device from entering onto that bus. The circuitry that permits such discrimination or "authentication" will also be applicable to any other context in which digital data must be distinguished as to source.

Figure 2:
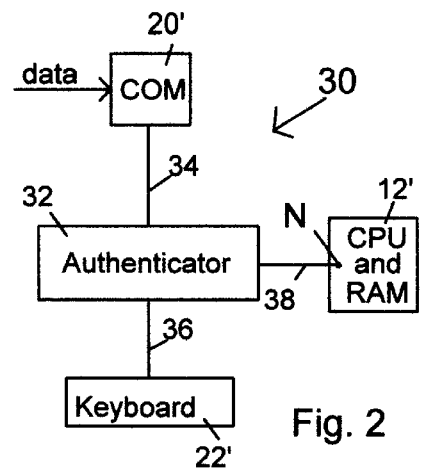
FIG. 2 is a block diagram of a preferred embodiment of the invention, and particularly of the means by which the authenticator circuit interconnects with standard components of a local computer.

The principal aspects of the invention are shown in first security circuit 30 of FIG. 2, which includes CPU/RAM unit 12' (the CPU and RAM functions are combined here for ease of discussion, and additional connections therefrom to a monitor, hard drive and other peripherals are deleted for purposes of clarity) and an alternative COM unit 20'. Also shown is an authenticator circuit 32 that connects to COM unit 20' through line 34, the distinction between COM unit 20 of FIG. 1 and COM unit 20' of FIG. 2 simply being that connection, i.e., instead of connecting to CPU 12 as does COM unit 20 of FIG. 1, COM unit 20' connects to authenticator circuit 32. Similarly, keyboard 22' of FIG. 2 connects through line 36 to authenticator circuit 32 (and elsewhere) instead of connecting through a bus to CPU 12 as did keyboard 22 of FIG. 1, and is otherwise equivalent to keyboard 22 of FIG. 1. Authenticator circuit 32 then connects through line 38 to the appropriate bus of CPU/RAM unit 12' at node N, and serves to determine whether or not any such data or commands as may arrive at authenticator circuit 32 will in fact enter onto line 38 so as to pass on to node N.

Figure 3:
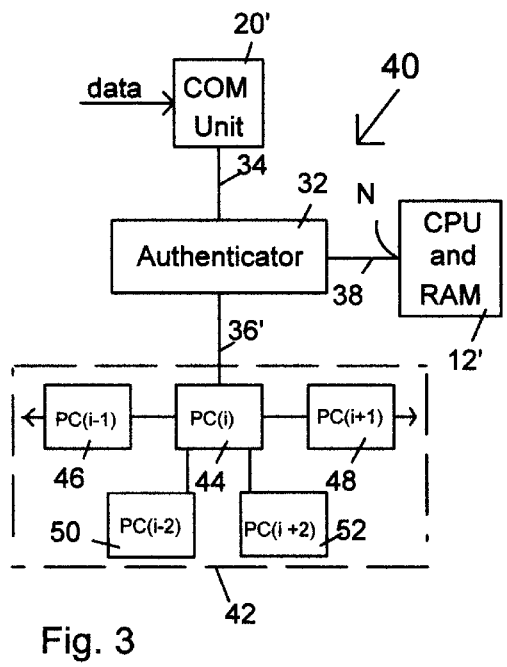
FIG. 3 is an alternative embodiment of the invention in the case that the local computer constitutes a server node of a local area network (LAN).

FIG. 3 shows an alternative second security circuit 40 that may be used in connection with a Local Area Network (LAN) 42. In second security circuit 40, COM unit 20', authenticator circuit 32, line 34 and line 38 function as in first security circuit 30 of FIG. 2, but in this case a different line 36', acting as a "peer to peer" connection, connects from authenticator circuit 32 not to a keyboard 22' but rather to PC(i) 44, which is a computer that acts as a server node for LAN 42. Additional computers, e.g., PC(i−1) 46, PC(i+1) 48, PC(i−2) 50 and PC(i+2) 52, etc., are connected directly to PC(i) 44, which serves as the LAN node for those computers, and of course other LAN configurations (such as a ring) are known. It is the practice for economic reasons to employ as such a server the more powerful of a collection of computers to which one may have access, and in such a case it is only PC(i) 44 that would require use of the invention. In this capacity, PC(i) 44 effectively acts in the role of a "firewall" with respect to the other computers, and the data arriving at PC(i) 44 that becomes "authenticated" is parallel data arriving from any of computers PC(i−1) 46 - PC(i+2) 52, etc. (Of course, PC(i) 44 will preferably include as well an authenticator circuit (not shown) connected as in FIG. 2 to its own keyboard or other input device.)

Figure 4:
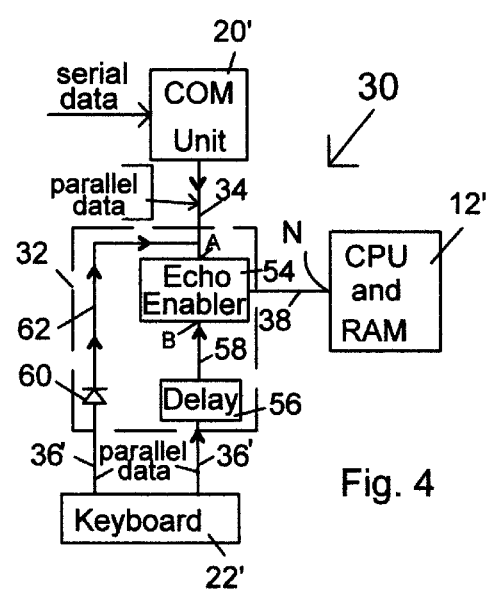
FIG. 4 is a more detailed block diagram of a preferred embodiment of the authenticator circuit and of the interconnections thereof with standard components of a local computer.

In FIG. 4, a first embodiment of authenticator 32, which is applicable in any of the aforesaid contexts, is seen to comprise an echo enabler 54 to which external line 34 from COM unit 20' connects at a first (A) input thereof; a delay circuit 56 to which external line 36' from keyboard 22' connects on a first side thereof; internal line 58 which passes from a second side of delay circuit 56 to echo enabler 54 at a second (B) input thereof; a set of diodes 60 to which external line 36' from keyboard 22' also connects on a first side thereof; and internal line 62 which connects from a second side of diodes 60 opposite the connection of external line 36' to line 34, i.e., between COM unit 20' and echo enabler 54. Diodes 60 permit data to pass from external line 36' on to internal line 62, but not from internal line 62 to external line 36'.

By the term "external" is meant a component that does not lie entirely within authenticator 32, and by "internal" in meant a component that is an integral part of authenticator 32. The reference to "diodes 60" in the plural is to stress that lines 34 and 36' carry parallel-encoded data words of 8, 16 or more bits, which for purposes of the invention are taken to represent data or commands that may be indistinguishable in themselves although they have different physical origins. (Of course, the principles under which authenticator 32 (or a variant thereof described below) operates are applicable to any data word of one or more bits, and may so be applied in other contexts.) External line 36', indeed, carries duplicates of such words, one such word being passed to delay circuit 56 and an identical such word being passed to diodes 60. As will be explained below, authenticator circuit 32 serves to identify that origin as being "local," i.e., from keyboard 22' or another local input device as discussed earlier, so that words that so originate will come to be passed on to node N of CPU/RAM unit 12', whereas similar or identical words deriving from COM unit 22' through external line 34 will not be so passed.

One part of authenticator 32 that so distinguishes such data is found in diodes 60, which as noted above allow data words originating from keyboard 22' or the like to pass from external line 36' therethrough and thence through internal line 62 to external line 34 and first input A of echo enabler 54. At the same time, those same words pass through delay circuit 56 onto internal line 58 and thence to second input B of echo enabler 54. On the other hand, although similar or identical words from COM unit 22' may likewise appear on external line 34 as a result of an external communication arising from outside the computer system, because of the indicated direction of connection of diodes 60, although those words will likewise pass over internal line 62 to diodes 60 (at the upper connection thereto in FIG. 4), they are not allowed to pass through diodes 60. As a consequence, data words that may appear on external line 34 and that are indistinguishable in themselves have become distinguished as to origin, i.e., those arriving by means of COM unit 20' appear on only one input (A) to echo enabler 54 (over external line 34), whereas those originating in keyboard 22' or the like appear at both inputs (A and B) to echo enabler 54 (over both external line 34 and internal line 58). For purposes of the invention, it only remains necessary for echo enabler 54 to transmit such words selectively.

To accomplish such selective transmission, echo enabler 54 passes on to line 38 and thence to CPU/RAM unit 12' any signal at input A of echo enabler 54 that is an "echo" of that same signal at input B of echo enabler 54 (hence the term "echo enabler"), but prevents transmission onward of any signal at input A that is not an echo of an identical signal at input B, i.e., there is no signal at input B of which the signal at input A could be an echo. The purpose of delay circuit 56, which may be of any convenient type known to those of ordinary skill in the art, is to ensure that data words that appear on both of lines 62 and 58 arrive at inputs A and B of echo enabler 54 simultaneously. (Delay circuit 56 may of course be quite superfluous except at very high clock speeds or when using very high speed transistors, or when for some reason substantial delays occur in passing a signal through diodes 60 and along internal line 62.)

Figure 5:
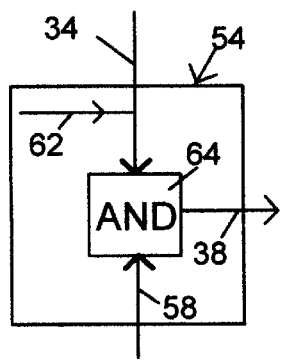
FIG. 5 is a block diagram of a preferred embodiment of an echo enabler circuit using an AND gate that serves as part of the authenticator circuit of the invention.

As noted, the operative function of the invention is carried out by echo enabler 54, which is a circuit that permits passage therethrough of a data word arriving at a first input thereto if and only if that word is "echoed" at a second input thereto. As now shown in FIG. 5, echo enabler 54 may thus incorporate a conventional two-input, multi-bit AND gate 64 connected to a voltage source $V_{dd}$ (not shown) in the usual manner, the number of bits to be accommodated corresponding to the number of bits (8, 16, etc.) in the words arriving thereto on lines 34, 58 and 62 as previously described. As is well known in the art, an AND gate provides an appropriate output if and only if identical bits are received simultaneously at the inputs thereto. Within a circuit that provides or can provide both a digital word and a duplicate (or "echo") of that word to the two inputs of such an AND gate, that AND gate then becomes an "echo enabler," meaning that passage of data therethrough becomes "enabled" by the appearance on one input of an echo of whatever word might have been placed on the other input, while such transmission is precluded in the absence of such an echo. (Of course, when using keyboard 22' or the like, which of the words then seen at inputs A and B of echo enabler 54 is to be called the "original" and which the "echo" is quite arbitrary.) The AND gate is of course well known in the art, but the use of such a gate as part of an echo enabler circuit for such purposes as are described herein was not previously known to the inventor.

Figure 6A:
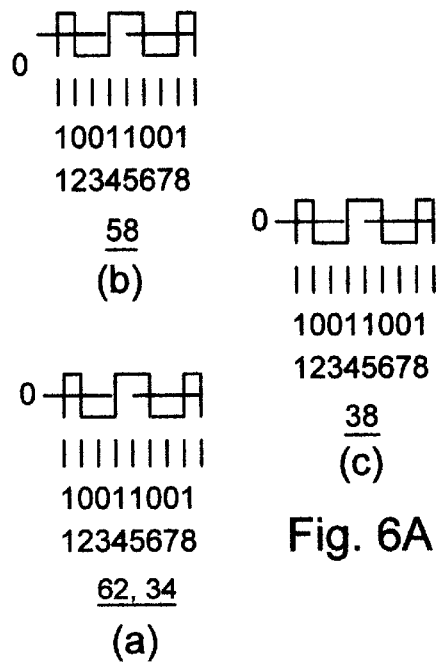
FIG. 6A is a diagram of locally-derived digital data as received and transmitted by an echo enabler circuit.

To illustrate the operation of echo enabler 54, FIG. 6A shows in part (b) thereof an arbitrarily selected digital word that arrives at a second input to AND gate 64 over internal line 58 from delay circuit 56. In part (a) of FIG. 6A is shown an echo of that word that arrives at a first input to AND gate 64 over internal line 62 from diodes 60 and thence over external line 34. Given that the word shown in FIG. 6A originated in keyboard 22' or the like and thus appears at both inputs of AND gate 64 as was described in connection with FIG. 4, in accordance with the ordinary operation of an AND circuit that word will likewise appear at the output thereof on line 38 leading to CPU/RAM unit 12', as shown in part (c) of FIG. 6A, and will thus bring about such response thereon as would have been expected had keyboard 22' been connected directly to the appropriate bus of CPU/RAM unit 12' in the usual fashion. In routine computer operations, the presence of authenticator 32, comprising in this case AND gate 64 and associated circuitry as was just described, is thus entirely transparent to an operator working at keyboard 22' or another such local input device.

Figure 6B:
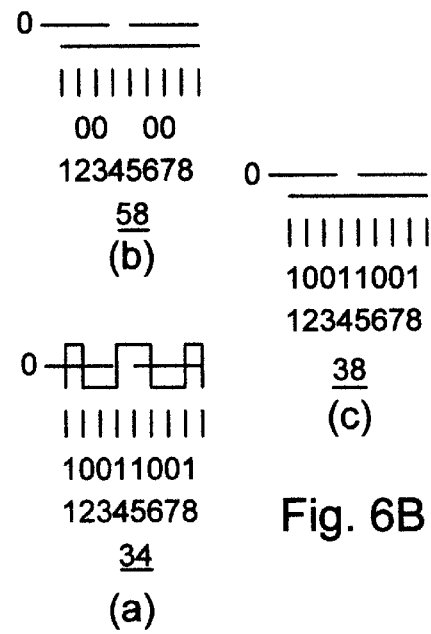
FIG. 6B is a diagram of remotely-derived digital data and the effect thereon of an echo enabler circuit.

As to an identical word arriving at the first input to AND gate 64 over external line 34 from COM unit 20', FIG. 6B illustrates that such a word will not be transmitted on to line 38 leading to CPU/RAM unit 12'. That is, a digital word presumed to have been placed on external line 34 is shown in part (a) of FIG. 6B, but as shown in part (b) of FIG. 6B, since that word did not originate within keyboard 22' or the like, there exists no corresponding word appearing at the first input to AND gate 64 that would have arrived over internal line 58. Consequently, the logical "AND" condition that would permit a word to pass through AND gate 64 is not satisfied. Part (c) of FIG. 6B then shows the result, i.e., no word appears on line 38 leading to CPU/RAM unit 12'. Even though a modem or ISDN unit or the like within a computer so protected may be in full operation with the phone line connected, and even though a remote operator may know the appropriate passwords that would otherwise permit further entry into the computer, digital data derived therefrom, e.g., from COM unit 20' onto external line 34, can have no effect within that protected computer. Moreover, since the "authenticating" effect just described comes about through the unattended operation of fixed circuitry within the local computer, there is nothing that a remote operator can do to change that situation.

Figure 7:
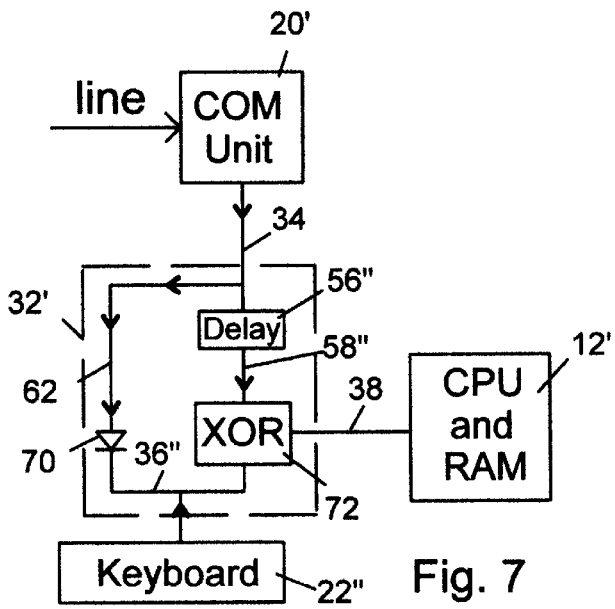
FIG. 7 is a block diagram of an alternative embodiment of an echo enabler circuit that uses an XOR gate.

An alternative form of the authenticator circuit is shown in FIG. 7, which shows a circuit essentially the same as that of the first embodiment shown in FIG. 4 except for the use of a different authenticator circuit, i.e., authenticator circuit 32'. That difference lies firstly in the replacement of diodes 60 with diodes 70, which are otherwise identical therewith except for having an opposite direction of connection between lines 62 and 36' (now 36", as will be noted below), and secondly in using an XOR gate 72 in lieu of AND gate 64. Data arriving at a first input to XOR gate 72 over line 36" (there now being no intervening delay circuit at this point) from keyboard 22" will be passed therethrough, since they satisfy the XOR logical condition inasmuch as no "echo" of that data appears on the second input of XOR gate 72. That is, such data will not pass through diodes 70 since the direction of connection of diodes 70 presents them as an open circuit to line 36". By contrast, data arriving from COM unit 22' over line 34 and ultimately onto that second input to XOR gate 72 will likewise pass onto line 62 connected thereto, and thence through diodes 70 and line 36" to that first input to XOR gate, and therefore will not be passed therethrough by virtue of their violating the "NOT BOTH" logical condition of XOR gate 72. (The XOR circuit 72 and its connections as described may thus be termed an "echo disabler" circuit, i.e., it is the "echo" on line 36" of data arriving on line 34 that prevents such data from being passed on to line 38.) For similar reasons as before, a delay circuit 56" is provided in parallel with diodes 70, i.e., in this case between line 34 and line 58" (which connects directly to the second input of XOR gate 72), i.e., in order to violate the "NOT BOTH" condition as desired for purposes of data source discrimination, both inputs must arrive at XOR gate 72 simultaneously. As before, this alternative "authenticating" effect comes about through the unattended operation of fixed circuitry within the local computer, so again there is nothing that a remote operator can do to change that situation.

Of course, one would not want the aforesaid condition to be permanent, since whatever devices that COM unit 20' was intended to serve could not then perform their functions. That unwanted effect is avoided by providing local means for disabling the function of the echo enabler, which again is preferably accomplished in a transparent fashion, i.e., just as the local operator would not know that an authenticator circuit was present and functioning, so would that operator not know that under different circumstances the functioning of that authenticator circuit had become disabled.

Figure 8A:
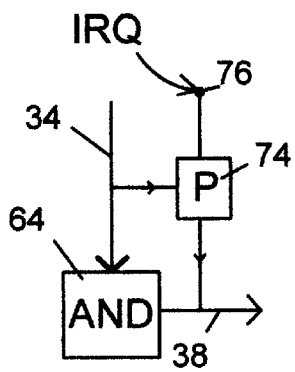
FIGS. 8A and 8B are block diagrams of disabling circuits as applied respectively to the echo enabler circuits of FIGS. 5 and 7.
Figure 8B:
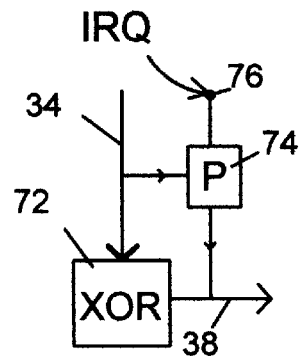

Perhaps the simplest means for disabling the function of authenticator circuits 32 or 32', insofar as such circuits prevent a digital word arriving over external line 34 from COM unit 20' from reaching line 38 that leads to CPU/RAM unit 12', is by providing a short circuit between lines 34 and 38. Data bits arriving over external line 34 onto one side of AND gate 64 or XOR gate 72 would thereby have been passed on to line 38 already, as would also any bits originating in keyboard 22' for the reasons previously described. A "disabling" circuit that provides such a short circuit between lines 34 and 38 is shown in FIG. 8A, and may, for example, comprise a set of normally-off pass transistors P 74 connected between lines 34 and 38 and having an interconnected set of transistor "gates" (in the MOSFET sense) activated by a single turn-on voltage at point 76, i.e., pass transistors P 74 are rendered conductive whereby data arriving on line 34 can pass directly to line 38. A turn-on voltage at point 76 of sufficient fanout to "turn on" all of pass transistors P 74 will thus render AND gate 64 ineffective for the authenticating purposes described, and as shown in FIG. 8B, which has the same connections of pass transistors P 74 as does FIG.8A, the same is true with respect to XOR gate 72.

A convenient source of such a turn-on voltage is found in interrupt (IRQ) signals. For example, the Intel i960CA RISC chip includes eight pins XINT0–XINT7 that when operated in dedicated mode are each individually allocated to a single interrupt source, and as shown in FIGS. 8A, 8B, that IRQ signal may be connected also to point 76 so as to turn on pass transistors P 74 and thus bypass either AND gate 64 or XOR gate 72. In other cases, IRQ signals may all be received at a single pin of the CPU, e.g., INTR pin N18 in the case of the Pentium (trademark of Intel) chip, where a high level indicates the presence of an interrupt signal from some I/O device, the particular device in question being identified by the IRQ number with which it has been configured. In such a case, only pin N18 or its equivalent in a comparable chip must be connected to point 76 in order to disable whatever authenticator circuit may be present. (With such a connection, the use of any other local device besides the modem (or an ISDN unit) that requires an IRQ would likewise cause disablement of the authenticator circuit, but that would be matter for outside security purposes since the computer operator, in using such other devices, would necessarily be present and able to detect incoming transmissions.) In any case, amplification of the IRQ signal may be required to attain the fanout necessary to drive all of pass transistors P 74. Another arrangement, applicable to an MCA bus, would connect point 76 to the appropriate one of the dedicated interrupt lines on that bus. The specific manner of implementing the foregoing circuitry, in other words, would depend upon the type of CPU employed, the type of bus, and so on, but foregoing description and drawings suffice to make the manner of implementaton clear to anyone of ordinary skill in the art, and who was familiar with the detailed structure of the CPU, bus, etc.

Figure 9:
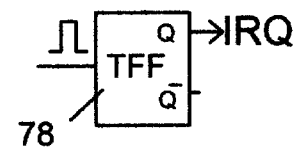
FIG. 9 illustrates the use of a toggle flip-flop circuit to convert a pulse IRQ signal into a fixed voltage level for disabling the echo enabler circuits of FIGS. 5 and 7.

In principle, an IRQ signal could comprise either a fixed voltage level or a pulse. In the case of a fixed voltage level, the IRQ signal (with any necessary amplification) would suffice in itself as a source of a turn-on voltage to point 76, which would of course be removed upon the use of the particular peripheral being terminated. As now shown in FIG. 9, a pulse IRQ signal may be connected into a toggle flip-flop (TFF) 78, and a Q output therefrom would provide the turn-on voltage at point 76, the necessary level of which may be predetermined in the design of TFF 78. Upon the appearance of a later pulse (upon terminating usage of the peripheral device), that turn-on voltage would be removed by the toggle effect of TFF 78.

Of course, other means for acquiring an appropriate turn-on voltage that is fixed at one value during the operation of any communications apparatus but which is removed upon terminating such usage may be found, and the invention must be understood to encompass all such procedures. The procedure, in other words, is to disable authenticator circuit 32 or 32' upon any local initiation of a communications sequence, which will then allow data arriving from COM unit 20' to pass through to CPU/RAM unit 12', but then to re-enable authenticator circuit 32 or 32' upon completion of that sequence.

Figure 10:
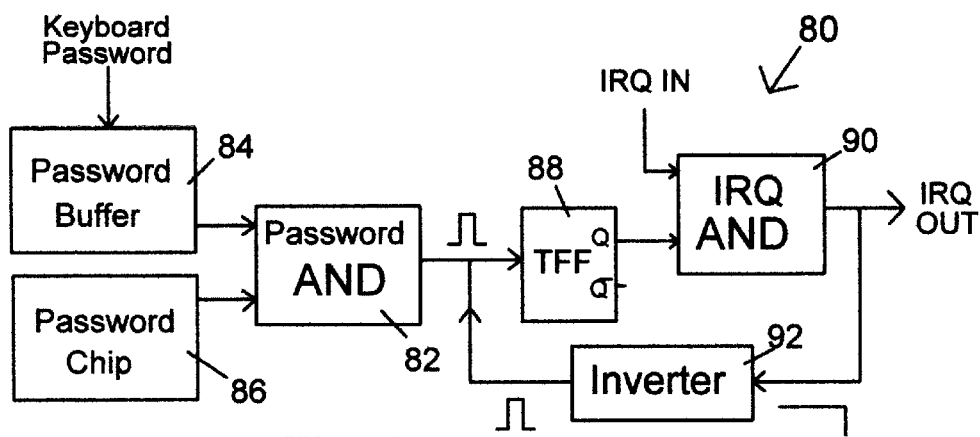
FIG. 10 shows a block diagram of a password authenticator circuit.

As now shown in FIG. 10, an analogous procedure may be used for purposes of physically disabling local peripheral units to which access is to be denied unless an operator can input a specific password. Such a system provides no protection against local "hackers" who might learn a correct password illegitimately, but it does protect against software programming that would seek to "work around" the password sequence. That is, a program that incorporates a password requirement will have a sequence of program code of which one line will call for operator input of the correct password in order to proceed with the program, i.e., so as to proceed on to carry out the subsequent lines of program code. To give a trivial example (in the BASIC language) of such a program, one might have lines of code such as:

```
5 PASSWORD = password

* * *

28 - - -

30 INPUT x: IF x = password THEN 32 ELSE END

32 - - -

* * *
``` wherein "---" may be any legitimate code, and that of line 32 in particular could be a READ, PRINT or other command that would call upon some peripheral device, access to which was sought to be protected by that password scheme. An input of an incorrect password to the foregoing program would immediately terminate the program, and access to the peripheral device so protected could not be gained.

The function of that password requirement would be entirely circumvented, however, and the security of such peripheral devices would be compromised, simply by inserting the code 29 GOTO 32. Although perhaps not so obviously as in the foregoing example, other programming languages likewise call upon such conditional transfers, any security purposes of which could similarly be circumvented by further programming. That possibility is precluded if apparatus are provided wherein the data word arising from entry of a correct password is also transmitted to an authenticator circuit similar to those previously described.

Such an apparatus is shown in password authenticator circuit 80 of FIG. 10, which includes a two-word input, single output password AND gate 82, to a first input of which the aforesaid data word arising from a password entry is transmitted in encoded form through a password buffer 84, and to the second input of which is connected password chip 86 which is structured to provide a selected password. That is, password chip 86 has a voltage source V in the usual manner, and that voltage is connected to preselected ones of m×n=p bit lines, where m can equate to the number of characters in the password and n to the bit size of each of the encoded characters (e.g., 8), so as to yield the selected password in standard encoded form (e.g., ASCII) for connection to password AND gate 82. Password chip 86 may conveniently be made from a programmable ROM chip, e.g., an EPROM, of a size adequate to accommodate the length of the maximum character string length permitted in the program for a password. The password as entered by an operator is transmitted to password buffer 84 by ordinary data transmission techniques as are appropriate to the particular computer.

The input of a toggle flip-flop (TFF) 88 connects to the output of password AND gate 82, and provides means whereby a pulse from password AND gate 82 can be converted into a fixed voltage level as previously discussed in connection with FIG. 2. The Q output of TFF 88 connects to one input of a two-input, one-output IRQ AND gate 90, and the second input of IRQ AND gate 90 is interjected at any convenient point along which an IRQ signal line controlling the peripheral device to be protected is transmitted. That is, the source of that IRQ signal is connected to the second input of IRQ AND gate 90, and the output of IRQ AND gate 90 is connected to that destination to which, with respect to the particular peripheral device to which that IRQ signal pertains and consonant with the particular computer architecture, that IRQ signal would have been directed had not authenticator circuit 80 been interjected therein. As a consequence, so long as a "correct" password (i.e., one identical to that stored in password chip 86) has been provided to password buffer 84, password AND gate 82 will provide an output that, when converted to a fixed voltage by TFF 88 and transmitted to IRQ AND gate 90, will permit the IRQ signal on the second input of IRQ AND gate 90 to pass therethrough. In the absence of there having been a correct password entry by the operator into password buffer 84, having no appropriate IRQ signal transmitted the protected peripheral cannot operate, even though a password-related conditional transfer in the operating program may have been bypassed.

When use of the peripheral device in accordance with there having been entry of a correct password is terminated, it is necessary that TFF 88 be returned to its opposite state having no Q output if protection of that particular peripheral is again to be provided. The procedure that returns TFF 88 to the state having no Q output is accomplished by inverter 92 that connects between the output of IRQ AND gate 90 and the input of TFF 88. In the ordinary course of operation of a peripheral in the multi-tasking environment to which IRQ signals pertain, termination of the use of that peripheral involves termination of the IRQ signal upon which it depends, and the resultant signal drop is converted by negative edge inverter 92 into a pulse that flips TFF 88 back to its original "no Q output" state. (A negative edge inverter is any circuitry that, through the use of diodes or the like, forms a pulse from a negative-going edge but does not respond to a positive-going edge. This restriction is required since otherwise the inverter would react to the positive edge of the IRQ signal as just permitted to pass through IRQ AND gate 90 and would immediately return TFF 88 to to its "no Q output" state.)

Figure 11:
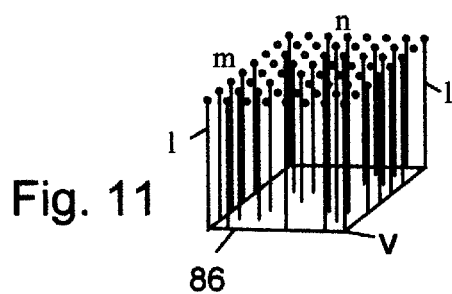
FIG. 11 shows exemplary circuitry for a password chip.

A circuit representation of password chip 86 is shown in FIG. 11 (voltage input and ground lines are not shown), and comprises a voltage plane V and lines 1 in an m×n=p array, but of which arbitrary ones of such lines 1 have been removed to yield the logical 0 and thus to form from the whole an arbitrarily selected, digitally encoded password. "Password chip 86" could of course be formed instead as an elongate board for insertion into a socket having (p+2) lines (including voltage and ground lines), as is done with many other additions to a computer motherboard. In either case, the p-bit password selected in this example could in principle be any one of $2^{64}$ possible words. Each such password would comprise up to eight 8-bit bytes, and is transmitted to password AND gate 82 in a manner appropriate to the CPU and data busses of the particular computer.

Of course, any of the foregoing applications of the several types of authenticator circuit are easily circumvented, e.g., a permanent short circuit could be connected between lines 34 and 38 as to the intended exclusion of data arriving over the modem, and a similar short circuit could be installed between the "IRQ IN" and "IRQ OUT" lines of FIG. 10 or at other convenient such places. However, no such circumvention of the circuitry of the invention can be accomplished by surreptitious reprogramming alone, but requires not only local access to the computer (as would be required for any reprogramming) but also opening up the computer and effecting hardware changes therein. Moreover, since such an entry into the computer is required even to change a password (i.e., a chip or card encoded with one password is replaced by another encoded with a different password), so long as the physical security of the computer interior is maintained, it is not possible to disable a computer so protected by the expedient of surreptitious changes of passwords. The addition of code that would bypass the entry of a password as in the example given above would clearly disable the particular protected peripheral of the computer (there would be no password entered so as to appear on the first input to AND gate 82), but in accordance with the principle of the invention, what is sought is protection against code-derived enablement of an operation that has previously been disabled by hardware means, and the invention accomplishes that end both as to data arriving at the computer through a modem or the local use of computer peripherals for which an operator does not know the appropriate password.

Through the use of De Morgan's theorems or the like, a person of ordinary skill in the art could of course devise any number of other digital circuits, perhaps using other gate or transistor types, that would essentially duplicate the operation of these authenticator circuits as shown and described, and all such variations are to be taken as being within the scope of the invention. Reference in the specification to particular CPU or computer types, the use of a Q rather than a Q output, or the assumption of positive logic and the like are likewise intended to be exemplary only and not limiting. Other arrangements and disposition of the aforesaid or like components, the descriptions of which are intended to be illustrative only and not limiting, may also be made without departing from the spirit and scope of the invention, which must be identified and determined only from the following claims and equivalents thereof.

I claim:

1. A data authenticator circuit having first and second input lines and an output line, further comprising:

source identification means for distinguishing between data words as having arrived within said authenticator circuit on one or the other of said first or second input lines; and authentication means for transmitting on to said output line those data words that will have arrived on a selected one of said first or second input lines to said output line, while preventing said transmission of data words that will have arrived on that one of said first or second input lines that was not so selected.

2. The data authenticator circuit of claim 1 wherein said source identification means comprises an echo enabler circuit.

3. The data authenticator circuit of claim 2 wherein said echo enabler circuit comprises a two-input, multibit AND gate, to the two inputs of which are respectively connected said first and second input lines, and wherein the output side of said AND gate constitutes said output line.

4. The data authenticator circuit of claim 1 wherein said source identification means comprises an echo disabler circuit.

5. The data authenticator circuit of claim 4 wherein said echo disabler circuit comprises a two-input, multibit XOR gate, to the two inputs of which are respectively connected said first and second input lines, and wherein the output side of said XOR gate constitutes said output line.

6. The data authenticator circuit of claim 1 further comprising disabling means for disabling the operation thereof.

7. The data authenticator circuit of claim 6 wherein said disabling means comprise shorting means connected between a selected one of said first and second input lines and said output line.

8. The data authenticator circuit of claim 7 wherein said shorting means comprise a set of pass transistors equal in number to the word size of the data words transmitted on said selected one of said first and second input lines.

9. The data authenticator circuit of claim 8 wherein said pass transistors have a common gate circuit respectively activated and deactivated by the imposition onto and removal therefrom of an IRQ signal.

10. The data authenticator circuit of claim 9 wherein said IRQ signal constitutes a fixed voltage level taken from a selected pin of a CPU within a computer.

11. The data authenticator circuit of claim 9 wherein said IRQ signal constitutes a fixed voltage level taken from a toggle flip-flop circuit that is driven by pulse signals from a selected pin of a CPU within a computer.

12. The data authenticator circuit of claim 1 wherein:

said first input line connects to a communications unit, the opposite side of which is connected to a serial port to which is connected a telephone line; and said second input line connects to a digital data source.

13. The data authenticator circuit of claim 12 wherein said communications unit comprises a modem having a UART, the output register of said UART being connected to said first input line.

14. The data authenticator circuit of claim 12 wherein said communications unit comprises an ISDN unit having an output register connected to said first input line.

15. The data authenticator circuit of claim 12 wherein said digital data source comprises a computer keyboard.

16. The data authenticator circuit of claim 12 wherein said digital data source comprises a mouse driver circuit having an attached mouse.

17. A password authenticator circuit for controlling access to a protected peripheral within a computer, comprising:

a first two-input, single output AND circuit, to a first input of which is transmitted a password as entered on a computer keyboard and to a second input of which is connected a source of digital data encoded to represent a pre-selected password;

a toggle flip-flop, a single input of which connects to the single output of said first AND circuit, and a selected output of which connects to a first input of a second two-input, single output AND circuit, the second input of which connects to a source of an IRQ signal and the output of which connects to said protected peripheral; and a negative edge inverter also connected on a first side thereof to said output of said second two-input, single output AND circuit, and on a second side thereof to said single input of said toggle flip-flop.

18. The password authenticator circuit of claim 17 wherein said source of digital data comprises a computer chip.

19. The password authenticator circuit of claim 17 wherein said source of digital data comprises a computer card inserted into a motherboard slot.

* * * * *